United States Patent
Prasadh

(10) Patent No.: US 8,706,936 B2
(45) Date of Patent: Apr. 22, 2014

(54) INTEGRATED CIRCUIT HAVING A BUS NETWORK, AND METHOD FOR THE INTEGRATED CIRCUIT

(75) Inventor: Ramamoorthy Guru Prasadh, Austin, TX (US)

(73) Assignee: ARM Limited, Cambridge (GB)

( * ) Notice: Subject to any disclaimer, the term of this patent is extended or adjusted under 35 U.S.C. 154(b) by 169 days.

(21) Appl. No.: 13/295,461

(22) Filed: Nov. 14, 2011

(65) Prior Publication Data

US 2013/0124767 A1   May 16, 2013

(51) Int. Cl.
*G06F 13/42* (2006.01)

(52) U.S. Cl.
USPC .............................. 710/105; 710/58; 370/452

(58) Field of Classification Search
USPC ........................................................ 710/105
See application file for complete search history.

(56) References Cited

U.S. PATENT DOCUMENTS

| | | | |
|---|---|---|---|
| 4,009,470 A | 2/1977 | Danilenko et al. | |
| 4,394,728 A | 7/1983 | Comfort et al. | |
| 4,458,314 A | 7/1984 | Grimes | |
| 4,463,445 A | 7/1984 | Grimes | |
| 4,470,112 A | 9/1984 | Dimmick | |
| 4,488,218 A | 12/1984 | Grimes | |
| 4,707,829 A | 11/1987 | Pendse | |
| 4,789,982 A * | 12/1988 | Coden ........................... | 370/451 |
| 4,924,380 A | 5/1990 | McKinney et al. | |
| 4,977,577 A * | 12/1990 | Arthur et al. .................. | 375/146 |
| 5,257,374 A | 10/1993 | Hammer et al. | |
| 5,283,904 A | 2/1994 | Carson et al. | |
| 5,524,235 A | 6/1996 | Larson et al. | |
| 5,535,395 A | 7/1996 | Tipley et al. | |
| 5,546,543 A | 8/1996 | Yang et al. | |
| 5,553,248 A | 9/1996 | Melo et al. | |
| 5,553,310 A | 9/1996 | Taylor et al. | |
| 5,581,782 A | 12/1996 | Sarangdhar et al. | |
| 5,583,999 A | 12/1996 | Sato et al. | |
| 5,596,749 A | 1/1997 | Cantrell et al. | |
| 5,625,846 A | 4/1997 | Kobayakawa et al. | |
| 5,689,657 A | 11/1997 | Desor et al. | |

(Continued)

FOREIGN PATENT DOCUMENTS

| | | |
|---|---|---|
| EP | 0 686 919 | 12/1995 |
| JP | 59-90444 A | 5/1984 |
| JP | 59-112326 | 6/1984 |

OTHER PUBLICATIONS

M. Doelz et al, "Extended Slotted Ring Architecture for a Fully Shared and Integrated Net" *Communications News*, Feb. 1986, 6 pages.

(Continued)

*Primary Examiner* — Ryan Stiglic
(74) *Attorney, Agent, or Firm* — Nixon & Vanderhye P.C.

(57) ABSTRACT

A bus network passes pending messages from bus interface to bus interface until they are downloaded at a target bus interface by a target device connected to the target bus interface. The messages are tagged with at least one download control bit. The download control bit has a priority state indicating that a message has already passed the target bus interface at least once without being downloaded. When controlling selection of messages for downloading by the target device, the target bus interface selects messages with the download control bit in the priority state with a greater probability than messages not having a download control bit in the priority state.

18 Claims, 7 Drawing Sheets

(56) References Cited

U.S. PATENT DOCUMENTS

| | | | |
|---|---|---|---|
| 5,802,330 A | 9/1998 | Dutton | |
| 5,832,278 A | 11/1998 | Pham | |
| 5,862,355 A | 1/1999 | Logsdon | |
| 5,878,279 A | 3/1999 | Athenes | |
| 5,937,205 A | 8/1999 | Mattson et al. | |
| 5,963,978 A | 10/1999 | Feiste | |
| 6,026,484 A | 2/2000 | Golston | |
| 6,058,449 A | 5/2000 | Linzmeier et al. | |
| 6,101,564 A | 8/2000 | Athenes et al. | |
| 6,128,672 A | 10/2000 | Lindsley | |
| 6,247,101 B1 | 6/2001 | Settles | |
| 6,253,262 B1 | 6/2001 | Rozario et al. | |
| 6,278,695 B1 * | 8/2001 | Christensen et al. | 370/254 |
| 6,295,553 B1 | 9/2001 | Gilbertson et al. | |
| 6,321,233 B1 | 11/2001 | Larson | |
| 6,330,245 B1 | 12/2001 | Brewer et al. | |
| 6,339,807 B1 | 1/2002 | Yasue | |
| 6,496,485 B1 | 12/2002 | Le | |
| 6,516,369 B1 | 2/2003 | Bredin | |
| 6,665,760 B1 | 12/2003 | Dotson | |
| 6,674,720 B1 * | 1/2004 | Passint et al. | 370/235 |
| 6,738,869 B1 | 5/2004 | Moran et al. | |
| 6,834,320 B1 | 12/2004 | Stoess et al. | |
| 7,143,219 B1 | 11/2006 | Chaudhari et al. | |
| 2002/0042856 A1 | 4/2002 | Hartwell et al. | |
| 2002/0059508 A1 | 5/2002 | Lentz et al. | |
| 2002/0065865 A1 | 5/2002 | Gilbert | |
| 2003/0188065 A1 | 10/2003 | Golla et al. | |
| 2003/0229742 A1 | 12/2003 | Moss | |
| 2003/0233503 A1 | 12/2003 | Yang et al. | |
| 2004/0068625 A1 | 4/2004 | Tseng et al. | |
| 2004/0083272 A1 | 4/2004 | Fuehrer et al. | |
| 2006/0047873 A1 | 3/2006 | Bose et al. | |
| 2006/0123169 A1 | 6/2006 | Chai et al. | |
| 2006/0149884 A1 | 7/2006 | Saen et al. | |
| 2007/0005909 A1 | 1/2007 | Cai et al. | |
| 2007/0038792 A1 | 2/2007 | Shin | |
| 2007/0101033 A1 | 5/2007 | Chen et al. | |
| 2007/0121659 A1 | 5/2007 | Pong | |
| 2007/0186027 A1 | 8/2007 | Klema et al. | |
| 2008/0209139 A1 | 8/2008 | Wang et al. | |
| 2008/0244231 A1 | 10/2008 | Kunze et al. | |
| 2009/0132733 A1 | 5/2009 | Codrescu et al. | |
| 2009/0138682 A1 | 5/2009 | Capps, Jr. et al. | |
| 2010/0064072 A1 | 3/2010 | Tang et al. | |
| 2011/0173357 A1 | 7/2011 | Ohmacht et al. | |
| 2011/0197038 A1 | 8/2011 | Henriksson et al. | |
| 2011/0255547 A1 | 10/2011 | Takasaka et al. | |
| 2012/0060169 A1 | 3/2012 | Steffens et al. | |

OTHER PUBLICATIONS

P. Maheshwari, "A Dynamic Load Balancing Algorithm for a Heterogeneous Computing Environment" *Proceedings of the 29th Annual Hawaii International Conference on System Sciences*, 1996, pp. 338-346.

S. Chang et al, "A Priority Selected Cache Algorithm for Video Relay in Streaming Applications" *IEEE Transactions on Broadcasting*, vol. 53, No. 1, Mar. 2007, pp. 79-91.

K.M. Lye et al, "A Simple Token Bus Protocol With Priority" IEEE Region 10 Conference TENCON '92, Nov. 1992, pp. 769-772.

S. Shimizu et al, "Design choices for the TOP-1 multiprocessor workstation" *IBM J. Res. Develop.*, vol. 35, No. 5/6, Sep. 1991, pp. 591-602.

S.K. Bose et al, "Improving the Priority Service Provided in a Token Ring With the New Ring/Bus Protocol" International Conference on Industrial Electronics, Control and Instrumentation, IECON '91, Oct. 1991, pp. 1695-1700.

A. Nakano et al, "Dynamic Resource Assignment for MC-CDMA with Prioritization and QoS Constraint" Proceedings of APCC2008, 2008, 5 pages.

R. Cohen et al, "An Efficient Priority Mechanism for Token-Ring Networks" *IEEE Transactions on Communications*, vol. 42, No. 2/3/4, Feb. 1994, pp. 1769-1777.

J. Xin et al, "A Priority-Based Transfer Scheme Based on Information Models in Switched Ethernet for Substation Process-Level" *Journal of Electrical & Electronics Engineering*, vol. 5, No. 2, 2005, pp. 1403-1409.

D. Jeong et al, "Implementation of a Multi-Class Fair Queueing via Identification of the QoS-Aware Parameters" *IEICE Trans. Commun.* vol. E87-B, No. 6, Jun. 2004, pp. 1524-1534.

K. Cho et al, "Design and Analysis of a Fair Scheduling Algorithm for QoS Guarantees in High-Speed Packet-Switched Networks" IEEE Conference on Communications, Jun. 1998, pp. 1520-1525.

K. Nakano et al, "Methods for Realizing a Priority Bus System" *Systems and Computers in Japan*, vol. 23, No. 5, 1992, pp. 24-31.

B. Grela-M'Poko et al, "Analysis of Asymmetric Prioritized Token Ring" IEEE Pacific Rim Conference on Communications, Computers and Signal Processing, Jun. 1989, pp. 222-225.

E.L. Hahne et al, "Fair Access of Multi-Priority Traffic to Distributed-Queue Dual-Bus Networks" Proceedings, Tenth Annual Joint Conference of the IEEE Computer and Communications Societies, INFOCOM '91, pp. 889-900.

C.N. Zhang et al, "Token Ring Arbitration Circuits for Dynamic Priority Algorithms" Proceedings of the 37th Midwest Symposium on Circuits and Systems, Aug. 1994, pp. 74-77.

J. Xin et al, "An Information Model Based Scheme for Priority-Based Transfer in Switched Ethernet for Substation Process-Level" 39th International Universities Power Engineering Conference, UPEC 2004, 2004, pp. 1063-1067.

T. Bai et al, "Flexible Fuzzy Priority Scheduling of the Can Bus" *Asian Journal of Control*, vol. 7, No. 4, Dec. 2005, pp. 401-413.

T. Huang et al, "A Priority-Promoting Strategy to Improve the Fairness in DQDB Network" IEEE International Conference on Communications, ICC'92, Jun. 1992, pp. 1-5.

* cited by examiner

| Stage 1 arbitration | Stage 2 arbitration | | Message downloaded |
| --- | --- | --- | --- |
| | Bus 0 P bit | Bus 1 P bit | |
| XP port-to-port bypass | X | X | port-to-port bypass |
| Bus download | 0 | 0 | Download message with S bit set, if any, else select bus 0 or bus 1 at random |
| | 1 | 0 | Bus 0 |
| | 0 | 1 | Bus 1 |
| | 1 | 1 | ILLEGAL |

FIG. 5

INTEGRATED CIRCUIT HAVING A BUS NETWORK, AND METHOD FOR THE INTEGRATED CIRCUIT

BACKGROUND OF THE INVENTION

1. Field of the Invention

The field of the present invention relates to the field of integrated circuits. More particularly, the invention relates to an integrated circuit having a bus network for communicating between devices of the integrated circuit.

2. Description of the Prior Art

An integrated circuit may have a bus network for communicating between different devices of the integrated circuit. In a free flowing bus network, messages transferred over the network cannot be queued up at the target node of the network. If a message reaches its target node, and the message cannot be downloaded from the target mode, then the message is passed on to another node of the network and continues to flow from node to node within the network until the message returns to the target node at a time when the target node can download the message. This means that the messages can pass the target node several times before being downloaded.

SUMMARY OF THE INVENTION

Viewed from one aspect, the present invention provides an integrated circuit comprising:

a plurality of devices; and a bus network configured to transfer messages between said plurality of devices, said bus network comprising a plurality of bus interfaces for connecting said devices to said bus network, and at least one bus connecting said plurality of bus interfaces; wherein:

said bus network is configured to transfer a message specifying a target device that is connected to a target bus interface;

said plurality of bus interfaces are configured to continue passing said message from bus interface to bus interface until said message is downloaded from said target bus interface by said target device;

said message is associated with at least one download control flag which is transferred along with said message via said bus network;

said at least one download control flag is settable to a priority state indicating that said message has passed said target bus interface at least once without said message being downloaded by said target device; and said target bus interface is configured to control selection of messages to be downloaded by said target device, with messages for which said at least one download control flag is set to said priority state having a greater probability of being selected than messages for which said at least one download control flag is not set to said priority state.

In the integrated circuit, a plurality of bus interfaces are connected by the bus network. The bus interfaces allow connection of devices to the bus network. When a message is transferred over the bus network, the message specifies a target device of the plurality of devices. The message is routed through the network and passed from bus interface to bus interface until the message reaches the target bus interface which is connected to the target device. If the target device can download the message, then the target bus interface may pass the message to the target device If the message cannot be downloaded by the target device, the message continues to pass from bus interface to bus interface until the message once more reaches the target bus interface at a time when it can be downloaded by the target device.

To reduce the likelihood of a message remaining in the network indefinitely without being downloaded, each message is associated with at least one download control flag which is transferred along with the message via the bus network. The download control flag is settable to a priority state which indicates that the message has already passed the target bus interface at least once without being downloaded by the target device. The target bus interface is arranged to control a selection of messages to be downloaded by the target device, with messages for which the least one download control flag is set to the priority state having a greater probability of being selected than messages which do not have to be at the download control flag set to the priority state. Hence, messages which have already passed the target bus interface one or more times are more likely to be selected for download than messages which are on their first pass through the target bus interface. This provides an improved quality of service for messages and reduces the likelihood that a message remains stuck in the network indefinitely without being downloaded.

In one example, the download control flag may comprise a bit appended to the message. One state of the bit (e.g. a value of 1) may represent priority state while the other state (e.g. a value of 0) may represent the non-priority state.

While the present technique may be implemented in any network in which messages flow from point to point within the network until they are downloaded, irrespective of the topology of the network, the technique is particularly useful in a network in which the bus interfaces are connected in a ring topology. In such a network, the messages circulate around the ring until they are downloaded from the network at the target bus interface.

The present technique may be applied to bus networks comprising a single bus connecting the plurality of bus interfaces. However, bandwidth can be increased and message delivery latency reduced by providing at least two buses connecting the bus interfaces. For example, in a ring topology, one bus may convey messages around the ring in a clockwise direction while another bus may transfer messages around the ring in an anticlockwise direction. When uploading a message onto the network, the source bus interface connected to the source device which issued the message may select one of the buses for transmitting the message, for example the bus which allows the message to be delivered to the target device via the shortest path.

In the case where there are at least two buses, multiple messages may arrive at the target interface at the same time via different buses. The at least one download control flag may comprise a priority flag which is used to control download arbitration between multiple messages specifying the same target device which are received in the same processing cycle. Hence, the target bus interface may use the priority flag of each of the received message to determine which of the messages to select for downloading by the target device.

The download arbitration need not be performed on every occasion when multiple messages are received. For example, if the target device targeted by those messages is not available for downloading a message, then there is no need to perform the download arbitration.

In the download arbitration, the target bus interface may select one of the multiple messages for downloading by the target device and then set the priority flag to the priority state for another of the multiple messages which is not selected for downloading. In this way, the message which loses the arbitration is marked for priority downloading on a future occasion so as to increase the probability that the message is downloaded relative to other messages not having the priority flag in the priority state.

In the download arbitration, if none of the multiple messages has the priority flag in the priority state, the target bus interface may select any one of the multiple messages for downloading by the target device. For example, the target bus interface may select one of the messages at random or may use a round robin or preferential selection scheme for selecting a message from one bus or another bus.

On the other hand, if one of the multiple messages has the priority flag in the priority state, then the target bus interface may select the message which has the priority flag in the priority state for downloading the target device. This means that the message which has already passed the target bus interface at least once without being downloaded is preferentially selected for downloading. This reduces the likelihood that a message will repeatedly cycle round the network without being downloaded by the target device.

The examples described in this specification relate to a network having two buses, and so the download arbitration may select one of two messages for downloading. However, it will be appreciated that in other networks there may be three or more buses, in which case on receiving three or more messages simultaneously, the download arbitration may select for downloading any one of the messages which are marked with the priority bit in the priority state.

The one or more buses connecting the bus interfaces need not be the only channel for passing messages within the network. For example, at least one of the bus interfaces may be a multi-port bus interface which comprises a plurality of device ports. Each device port allows connection of a device to the bus interface. If two or more devices are connected to the same bus interface via respective device ports, then these devices may exchange messages directly from one port to another port of the same bus interface, without needing to transfer a message over the buses which link different bus interfaces. By using the port-to-port message path to transmit port-to-port messages between the devices, bandwidth on the buses of the bus network can be conserved for messages transmitted between devices connected to different bus interfaces.

If in a same processing cycle the multi-port bus interface receives both a bus message from at least one bus and a port-to-port message on the port-to-port message path, with each message targeting the same target device, then the bus interface may select one of these messages for downloading.

While various selection schemes may be used, in one embodiment the multi-port bus interface may use a weighted round robin scheme to select either the bus message or the port-to-port message, with the round robin scheme being weighted to select the bus message more frequently than the port-to-port message. The bus message will typically have fewer opportunities to be downloaded than the port-to-port message, because while the port-to-port message can be downloaded in any cycle in which no bus message targeting the same target device is received from the bus, as well as in cycles allocated to port-to-port messages by the weighted round robin scheme, the bus message will need to go round the network once more before it can be downloaded again. Therefore, favouring selection of the bus message over the port-to-port message can improve the quality of service of message downloading and reducing the likelihood of a bus message being starved of the opportunity to be downloaded.

In the case of a multi-port bus interface, the bus interface may implement a two-stage download arbitration scheme, in which on receiving multiple bus messages and a port-to-port message in the same processing cycle each targeting the same target device, the target bus interface first determines whether or not to download a bus message or a port-to-port message, and if the port-to-port message is not selected, then performs the download arbitration for the multiple bus messages based on the priority flag for those messages.

Hence, the priority flag enables the target bus interface to favour downloading of messages which have missed out on an opportunity to be downloaded because they lost out in contention for download with another message targeting the same target device which was received by the target bus interface in the same processing cycle.

Another reason why a message arriving at the target bus interface may not be downloaded is that the target device may not be ready to receive the message. While download opportunities at the target device may arise reasonably frequently, it is possible that each time a particular message returns to the target bus interface, a preceding message has already taken the available download opportunity for the target device, and so the message still cannot be downloaded. If this is repeated several times, then the message may be starved of the opportunity to be downloaded.

To address this problem, the at least one download control flag may comprise a starvation flag. If on receiving a message for which the starvation flag has not already been set to the priority state, the target device specified by that message is not available to download the message, then the starvation flag may be set to the priority state. The message with the starvation flag set in the priority state is then provided with an increased probability of download on future occasions, to reduce the likelihood that the message continues flowing through the network indefinitely.

A counter may be used to detect whether a message has been starved of downloading. The counter may be incremented each time a message for which the starvation bit has been set passes the target bus interface at time when the message cannot be downloaded because the target device is not available for downloading. When the counter reaches a threshold value (e.g. 3), a download opportunity for the target device can be reserved for the message having the starvation flag set. Once a download opportunity has been reserved for the message with the starvation bit set to the priority state, then other messages not having the starvation flag set to the priority state may be prevented from being downloaded by the target device in the reserved download opportunity. Therefore, the reserved download opportunity remains untaken so that when the message with the starvation flag set returns to the target bus interface, the message can be downloaded by the target device. In this way, the contention between an earlier message and a later message can be resolved to allow the later message to be downloaded even in the case where the earlier message is the first to encounter an available download opportunity.

The configuration of the target bus interface may be made more efficient by preventing the starvation flag being set to the priority state for one message if another message specifying the same target device and being transmitted on the same bus already has the starvation flag set to the priority state. By ensuring that only one message can have its starvation flag set in the priority state for each bus-target device pair, there is no need to track which particular message for that bus and target device is the message whose passes round the network are being counted. The counter can simply be incremented each time a message on the relevant bus having the starvation flag set and specifying the relevant target device passes the target bus interface. If any other messages on the same bus for the same target device are also being starved of downloading then they can have the starvation flag set once the previous starved message has been downloaded. By dealing with download starvation of one message at a time, the configuration of the target bus interface can be made less complex.

Although it is possible to use only one of the priority flag and the starvation flag, preferably both flags are used to allow the target bus interface to address both contention between messages received from different buses in the same processing cycle using the priority flag and contention between messages received on the same bus in different processing cycles using the starvation flag. In this case, a predetermined order of precedence between the priority flag and the starvation flag may be used. For example, the priority flag may take precedence over the starvation flag so that in the download arbitration, if a message has the priority bit set to the priority state, then that message is downloaded, but otherwise a message having the starvation flag in the priority state can be downloaded in preference to a message not having either of the priority flag and starvation flag set. Hence, the starvation flag may provide for preferred download selection even if the counter associated with the message has not yet reached the threshold required for declaring starvation.

Viewed from another aspect, the invention provides an integrated circuit comprising:

a plurality of device means for providing data processing functions; and bus network means for transferring messages between said plurality of device means, said bus network means comprising a plurality of bus interface means for connecting said device means to said bus network means, and at least one bus means for connecting said plurality of bus interface means; wherein:

said bus network means is for transferring a message specifying a target device means that is connected to a target bus interface means;

said plurality of bus interface means are configured to continue passing said message from bus interface means to bus interface means until said message is downloaded from said target bus interface means by said target device means;

said message is associated with at least one download control flag which is transferred along with said message via said bus network means;

said at least one download control flag is settable to a priority state indicating that said message has passed said target bus interface means at least once without said message being downloaded by said target device means; and said target bus interface means is configured to control selection of messages to be downloaded by said target device means, with messages for which said at least one download control flag is set to said priority state having a greater probability of being selected than messages for which said at least one download control flag is not set to said priority state.

Viewed from a further aspect, the present invention provides a method for an integrated circuit comprising a plurality of devices, a bus network configured to transfer messages between said plurality of devices, said bus network comprising a plurality of bus interfaces for connecting said devices to said bus network, and at least one bus connecting said plurality of bus interfaces; said method comprising steps of:

transferring a message over said bus network, wherein said message specifies a target device that is connected to a target bus interface, and said message is associated with at least one download control flag which is transferred along with said message via said bus network; and passing said message from bus interface to bus interface until said message is downloaded from said target bus interface by said target device;

wherein said at least one download control flag is settable to a priority state indicating that said message has passed said target bus interface at least once without said message being downloaded by said target device; and said method comprises said target bus interface controlling selection of messages to be downloaded by said target device, with messages for which said at least one download control flag is set to said priority state having a greater probability of being selected than messages for which said at least one download control flag is not set to said priority state.

The above, and other objects, features and advantages of this invention will be apparent from the following detailed description of illustrative embodiments which is to be read in connection with the accompanying drawings.

BRIEF DESCRIPTION OF THE DRAWINGS

FIG. 5 is a table showing download arbitration between messages received by a target bus interface in the same processing cycle;

DESCRIPTION OF THE EMBODIMENTS

Figure 1:
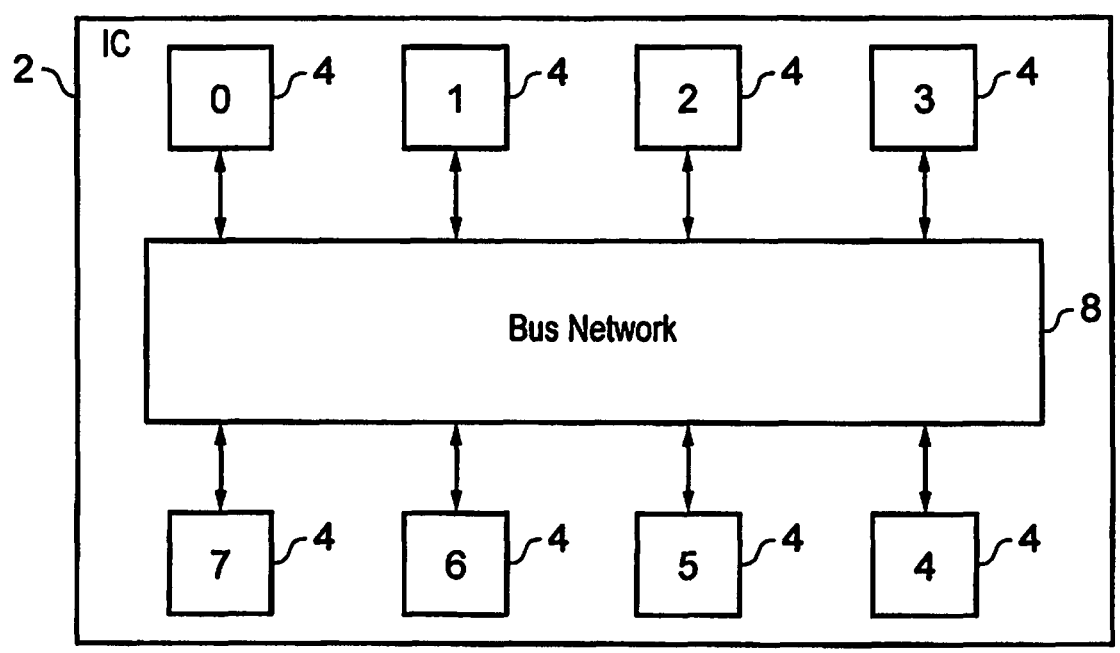
FIG. 1 illustrates an integrated circuit comprising a bus network.

FIG. 1 illustrates an integrated circuit 2 comprising a number of devices 4. The devices 4 are connected to a bus network 8 for transferring messages between the devices 4. For example, the devices 4 may include a processor, a graphics processor, a co-processor, a memory, a memory controller, a direct memory access (DMA) controller or an interface for communicating with an off-chip device. More or fewer devices 4 may be provided as desired.

Figure 2:
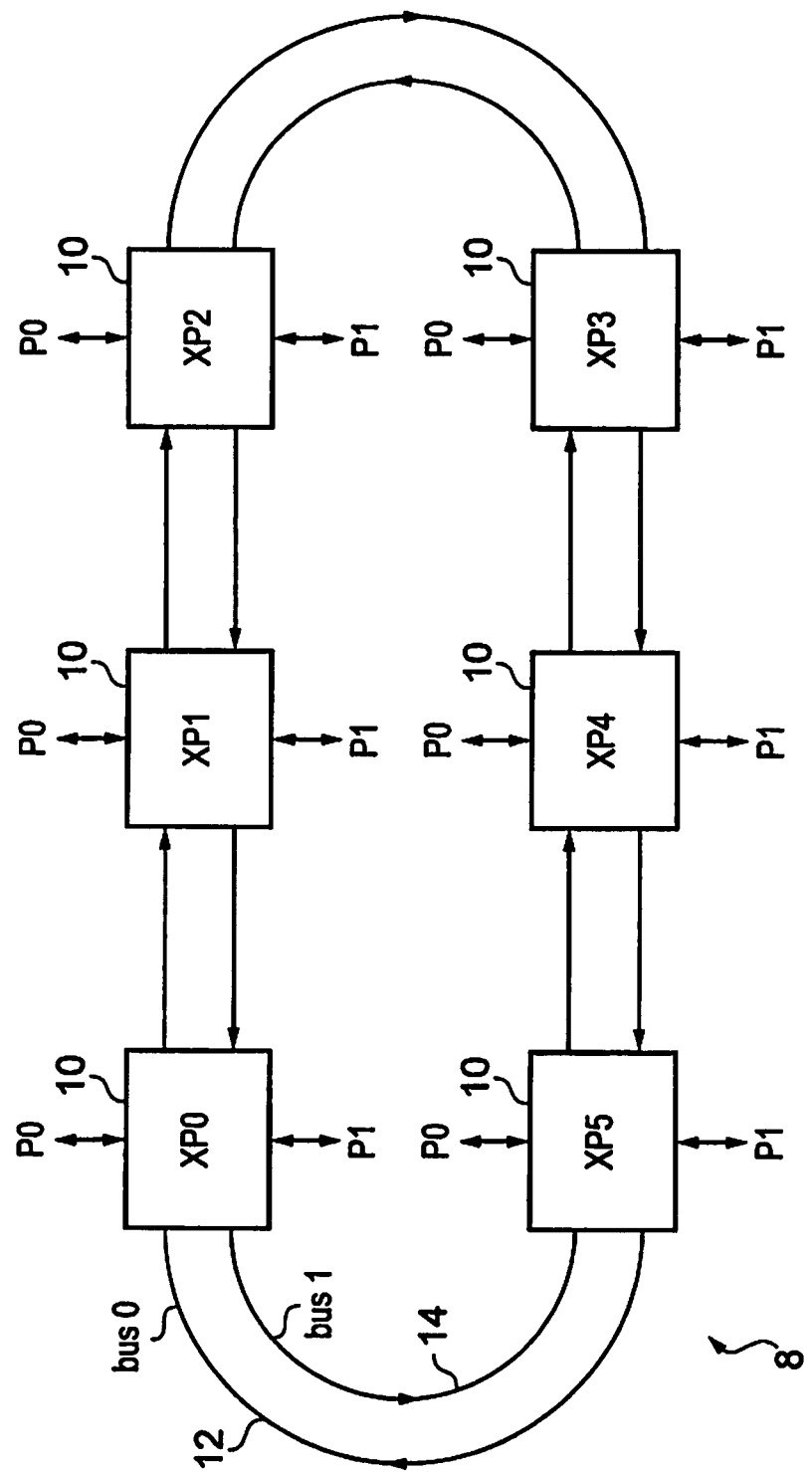
FIG. 2 illustrates an example of a bus network having a ring topology.

FIG. 2 illustrates an example of the bus network 8 having a ring topology. The bus network 8 comprises a number of bus interfaces 10 (also referred to as cross points XP). Each bus interface 10 allows connection of at least one device 4 to the network 8. In this example, each bus interface 10 has two input/output ports P0, P1 each for connection of a respective device 4 to the bus interface 10. However, it will be appreciated that it is not essential for each bus interface 10 to be a multi-port bus interface, and some bus interfaces 10 may only have one device port. Each device 4 connected to a port of a bus interface 10 may upload messages to the bus interface 10 for delivery onto the network 8 and download messages from the bus interface 10 issued from other devices 4 connected to the network 8.

The bus interfaces 10 are connected by a first ring bus 12 and a second ring bus 14, which connect the bus interfaces 10 in a ring topology. The first bus 12 conveys messages from bus interface 10 to bus interface 10 in a clockwise direction, while the second bus 14 conveys messages in an anticlockwise direction. When transmitting a message onto the bus, the bus interface 10 which receives the message from a source device 4 may determine whether it is more efficient to route the message via the first bus 12 or the second bus 14. For example, if a message is received at bus interface XP0 and specifies a target device connected to bus interface XP5, then it is more efficient to transmit the message via bus 14 than bus 12, since the delivery path from bus interface XP0 to bus interface XP5 is shorter via bus 14 than via bus 12. Each bus interface 10 may maintain a table indicating, for each other bus interface, which of the buses 12, 14 should be used for messages targeting a device connected to that bus interface.

The bus network 8 is arranged so that messages, once transmitted via the buses, cannot be queued for downloading at a bus interface 10. Instead, each message passes from bus interface 10 to bus interface until the message reaches its target bus interface 10 and can be downloaded by the target device 4 at the target bus interface 10. If the message cannot be downloaded, for example because the target device 4 is not ready to download a message, or because another message targeting the same target device 4 is selected for downloading ahead of the message, then the target bus interface 10 passes the message to the next bus interface 10 around the ring. The message continues circulating round the network 8 until it is eventually downloaded by the target device 4 from the target bus interface 10.

Figure 3:
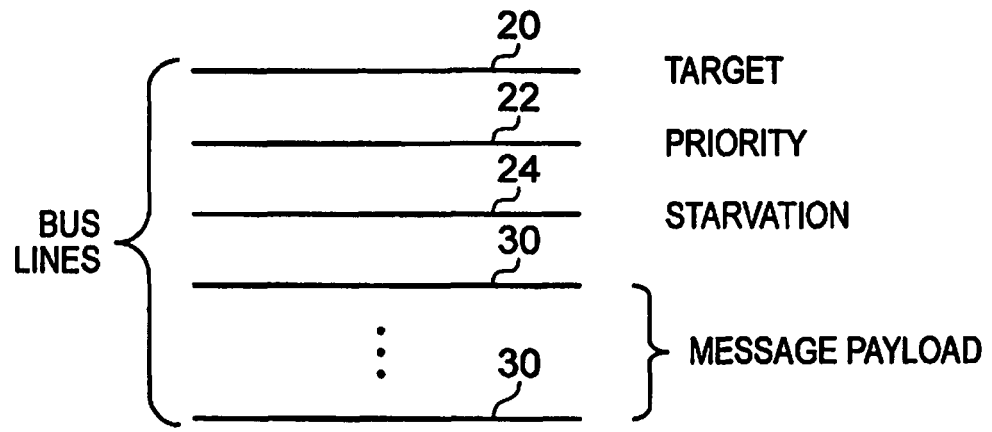
FIG. 3 shows an example of bus lines for transmitting a message within the bus network.

FIG. 3 shows an example of a signal format of messages transmitted via the bus. The buses 12, 14 may have respective bus lines for transmitting each kind of information, including a target device line 20 for specifying the target device to which the message is to be sent. The target device may for example be specified by identifying the target bus interface 10 and/or the target device port to be used to download the message. In some examples, the message may specify more than one target device using a target device vector having a number of bits each indicating whether or not a corresponding device 4 is a target device for that message.

The bus message lines also include a priority bit line 22 for transmitting a priority flag and a starvation bit line 24 for transmitting a starvation flag. The priority and starvation flags are both examples of download control flags which are used for prioritizing downloading of messages. The bus also has several bus lines 30 for transmitting any kind of information required for the message payload. It will be appreciated that further bus lines may be provided if other kinds of information are to be transmitted along with the message.

Figure 4:
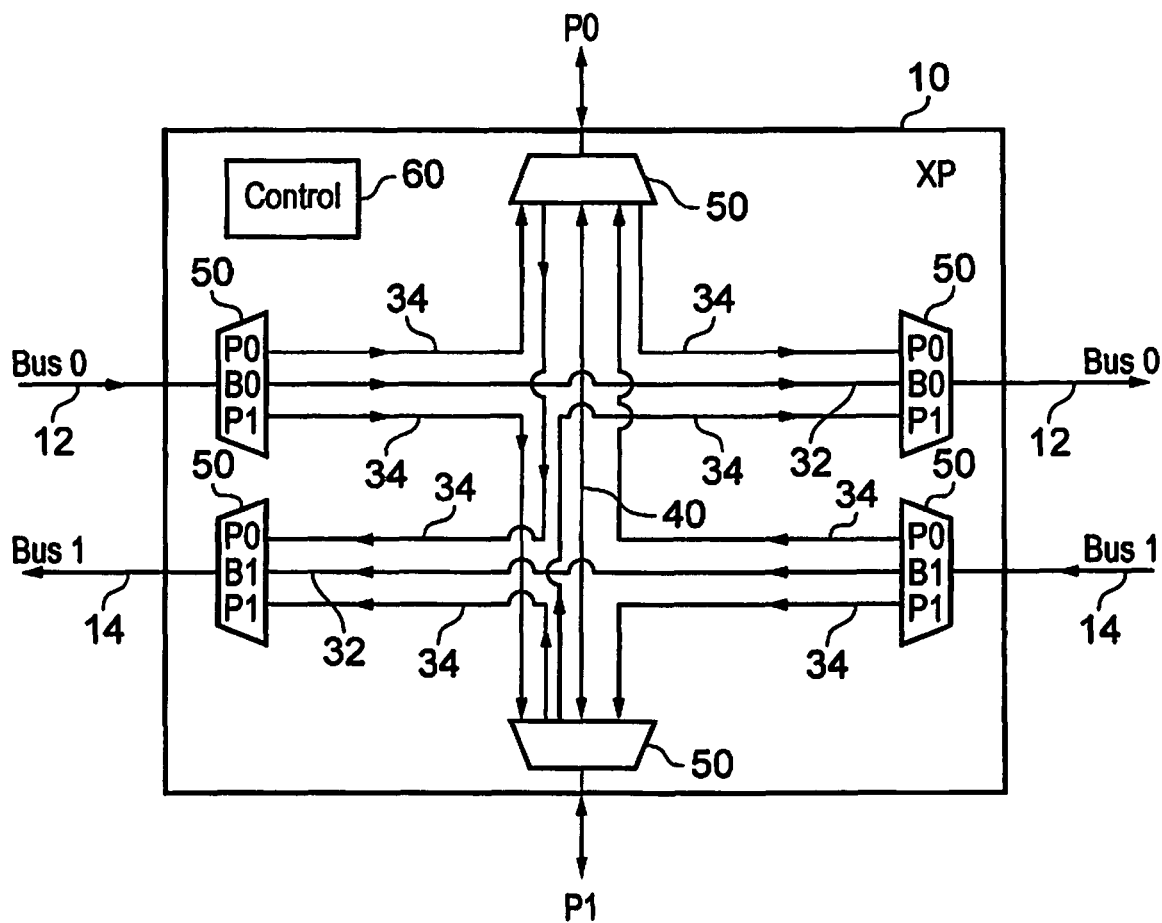
FIG. 4 illustrates an example of a bus interface for connecting devices to the bus network.

FIG. 4 show an example of one of the bus interfaces 10. The bus interface 10 includes various signal lines for transferring messages between the buses 12, 14 and the devices 4 connected to the input/output ports P0, P1. The signal lines include direct bus lines 32 for transmitting a message received on a bus directly to the next bus interface 10 along that bus, bus-to-device lines 34 for transferring messages between a bus 12, 14 and a device 4, and a port-to-port bypass line 40 for transferring messages directly between the devices 4 coupled to each port P0, P1 of the interface 10. Multiplexers 50 are provided to select which path a particular message is routed to on receipt from a bus 12, 14 or device 4. Control circuitry 60 is provided to control the multiplexers 50.

The port-to-port bypass line 40 allows messages to be transferred between devices 4 connected to the same interface 10 without using up a message slot on one of the buses 12, 14. To increase efficiency, devices that are likely to communicate with one another relatively frequently can be connected to different ports of the same bus interface 10 to make use of the fact that the port-to-port bypass line 50 allows quicker delivery of messages than the buses 12, 14.

As shown in FIGS. 2 and 4 each bus interface may receive messages from both the first bus 12 and the second bus 14. Also, a message may be received by the port-to-port bypass line 50. Each device 4 may only be able to download a single message at a time, so the control circuitry 60 may determine whether the target device is ready to download a message, and if so, to perform download arbitration for selecting which of the messages received for the same target device should be downloaded by the target device.

FIG. 5 shows a table indicating the download arbitration performed by the control circuitry 60 of the bus interface 10. As shown in FIG. 3, each message transferred by the buses has a priority bit 22 which can be set to a priority state (in the example of FIG. 5, by setting the bit to a value of 1). The priority bit is set to the priority state if, when arbitrating between two messages received for the same target device in the same cycle, a message loses the arbitration and so is passed on round the network again. In the arbitration, a message which already has the priority bit set to the priority state is preferred for selection over another message not having the priority bit set to the priority state. This ensures that messages which have already passed round the bus network at least once are more likely to be selected for downloading than messages which are on the first pass round the network.

As shown in FIG. 5, the bus interface 10 performs a two stage arbitration. In the first stage, the bus interface 10 determines whether to select a message from one of the buses 12, 14 or whether to select a message form the port-to-port bypass path 40 for downloading by the target device. For the stage one arbitration, the control circuitry 60 of the target bus interface 10 uses a weighted round robin scheme in which messages from the bus 12, 14 are selected more frequently then messages from the port-to-port bypass path 40. For example, each processing cycle may be allocated for downloading either a bus message or a port-to-port message, with more cycles being allocated for bus messages than for port-to-port messages. In cycles allocated to the port-to-port messages, then any port-to-port message received in that cycle is transferred via the port-to-port bypass path 40.

On the other hand, in cycles allocated to downloading of a bus message, or cycles in which no port-to-port message is pending, a stage two arbitration is performed by the control circuitry 60. The stage two arbitration is dependent on the state of the priority bit 22 for each of the messages received by the buses 12, 14. If either of the received messages has the priority bit set to the priority state (in the example FIG. 5, where the P bit equals 1), then the corresponding message having the priority bit set to the priority state is selected for downloading by the target device, and the control circuitry 60 sets the P bit for the other message to the priority state.

On the other hand, if neither of the received messages has its priority bits set to the priority state (P=0 in this example), then the control circuitry 60 determines whether either message has its starvation bit 24 set. If a message has the starvation (S) bit set (e.g. if S=1) then that message is selected for download. If the messages have neither the priority bit nor the starvation bit set to the priority state, then the control circuitry 60 selects any one of the messages for downloading by the target device 4. For example, the control circuitry may select a message at random.

Since only the message which loses a download arbitration can have its priority bit set to the priority state, and the message which wins the download arbitration will be downloaded by the target device and will no longer pass round the network, it is impossible for both received messages to have the priority bit set to the priority state. The use of the priority bit will be explained further with respect to FIG. 9 below.

Figure 6:
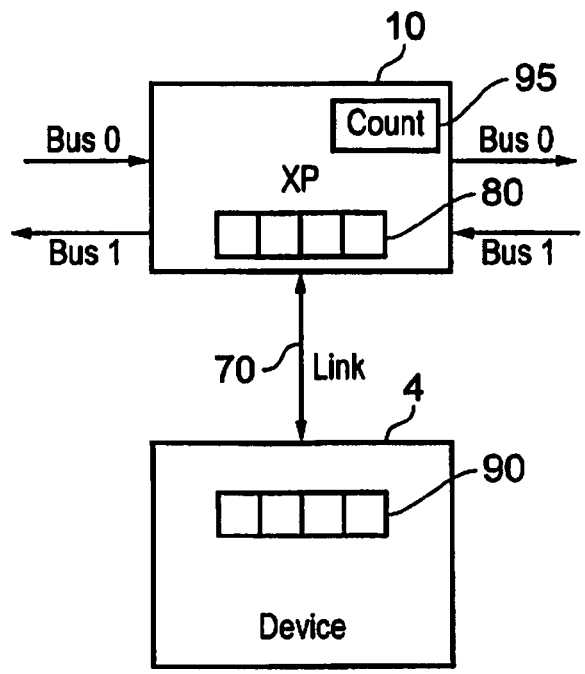
FIG. 6 illustrates a link interface between a bus interface and a device connected to the bus interface.

FIG. 6 shows an example of the device link 70 between a bus interface 10 and a device 4 connected to the bus interface. The bus interface 10 and device 4 each have a buffer 80, 90 for storing messages after they have been transferred over the link 70. For example, if the device 4 wishes to transmit a message over the bus network, then the device 4 must wait until a space is available in the buffer 80 of the bus interface 10 before transmitting the message across the link 70. When a bus slot on one of the buses 12, 14 becomes available, the bus interface 10 then transmits one of the buffered messages in that bus slot.

Similarly, the device 4 reads messages from the buffer 90 when it is ready to receive the messages. When a message arrives at the target bus interface 10 via the bus network 8, the message cannot be downloaded until there is a space in the buffer 90 of the device 4. To keep track of whether there is space in the buffer 90, the device 4 may allocate to the bus interface 10 a download credit each time space becomes available in the buffer 90. The download credit indicates to the bus interface 10 that there is a download opportunity for downloading a message from the bus interface 10. When a message arrives at the target bus interface 10, the bus interface 10 determines whether a download credit is available from the target device 4, and if not, then the message is passed to the next bus interface to continue passing round the bus network. The message will then make repeated attempts to download each time the message arrives at the target bus interface 10, until eventually a download credit is available when the message arrives at the target bus interface 10, and the message can be downloaded to the buffer 80 of the device 4.

On rare occasions, it is possible that each time the message attempts to be downloaded at the target bus interface, there is no download credit available, causing the message to continue spinning round the network indefinitely. This scenario is called download starvation. The starvation bit 24 is provided for each message to help to detect the download starvation scenario and to handle this so that messages marked with a starvation bit can be reserved a download credit. The target bus interface 10 also maintains a counter 95 for monitoring download starvation.

Figure 7:
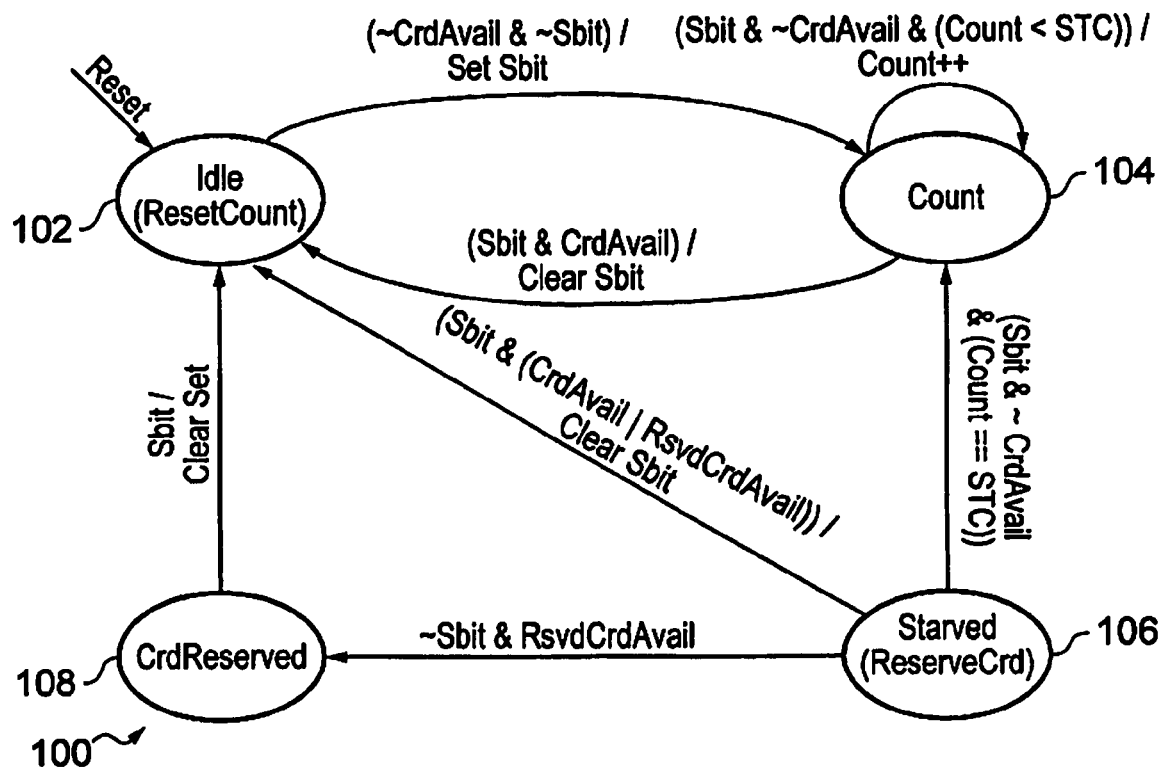
FIG. 7 illustrates a finite state machine for controlling setting of the starvation flag and reservation of download opportunities.

FIG. 7 shows an example of a finite state machine 100 used by the control circuitry 60 of target bus interface 10 to control handling of the starvation bit 24 for messages targeting a particular target device 4 connected to the target bus interface 10. Initially, the state machine 100 is in an idle state 102 in which none of the messages targeting the target device 4 have the starvation bit to the priory state.

If a message arrives at the bus interface 10 when no download credit is available from the target device 4, then the bus interface 10 sets the starvation bit for that message to the priority state and the state machine 100 transitions to the count state 104. During the count state 104, if the message having the starvation bit set to the priority state is received at the bus interface 10 and a download credit is available, then the state machine 100 transitions back to the idle state 102 and the message is downloaded by the target device 4. On the other hand, if no credit is available when the message having the starvation bit set is received at the target bus interface 10, and the counter 95 has not yet reached a starvation threshold count STC, then the counter 95 is incremented and the state machine remains in the count state 104. The counter 95 indicates the number of times a download attempt for the message was unsuccessful because there was insufficient download credit from the target device 4.

If, while in the count state 104, the message with the starvation bit set to the priority state is received at the target bus interface 10 and the counter 95 has reached a starvation threshold count STC, then the state machine 100 transitions to a starved state 106. At this point the download starvation scenario is detected and a download credit for the target device is reserved for the message which has the starvation bit set to the priority state.

While the state machine 100 is in the starved state 106, if the message having the starvation bit set is received at a time when a download credit is available, then the message is downloaded and the state machine 100 returns to the idle state 102.

On the other hand, if a message that does not have the starvation bit set to priority state is received when a reserved download credit is available, then the message is prevented from using the available download credit, because this credit has been reserved for the message having the starvation bit set. In this case, the state machine 100 transitions to the credit reserved state 108, and the message is not downloaded and is passed to another bus interface 10 in the network. The state machine 100 then remains in the credit reserved state 108 until the message having the starvation bit set is received once more at the target bus interface 10, at which point the message is downloaded by the target device using the reserved download credit.

Hence, by setting the starvation bit to trigger counting of the number of times a message could not be downloaded due to insufficient download credit, triggering a starvation scenario when the count reaches a threshold value, and reserving a credit for the starved message, the bus interface ensures that no message can be starved of downloading more than a given number of times. This prevents messages continuing to pass around the network indefinitely.

While it would be possible to allow the bus interface 10 to set the starvation bit for any messages for which starvation is detected, this would require multiple counters 95 and would require the bus interface 10 to track which particular message corresponds to each counter 95.

The configuration of the bus interface 10 can be simplified by preventing the bus interface 10 from setting the starvation bit to the priority state for more than one message which targets the same target device 4 and is received on the same bus 12, 14. Hence, in the example shown in FIG. 2, each bus interface 10 may be allowed to set the starvation bit to the priority state for a maximum of four messages:

one message received on bus 12 targeting the device connected to port P0;
one message received on bus 14 targeting the device connected to port P0;
one message received on bus 12 targeting the device connected to port P1; and
one message received on bus 14 targeting the device connected to port P1.

The bus interface 10 may maintain a separate counter 95 and state machine 100 for each bus/port combination. For example, while the state machine 100 is in the idle state 102 for messages received on bus 12 that target the device connected to port P0, another state machine 100 may be in the starved state 106 for messages received on bus 12 that target the device connected to port P1. Since only one message for each bus/port combination can have its starvation bit set to the priority state, there is no need to provide any further information for distinguishing between multiple messages targeting the same target device and received on the same bus. The bus interface 10 can determine which counter 95 and state machine 100 corresponds to which message simply from the state of the starvation bit 24, the target device specified by the message, and the bus from which the message is received.

Also, the bus interface 10 which sets the starvation bit for a message is the only bus interface 10 which is allowed to clear the starvation bit. Hence, a bus interface 10 cannot clear the starvation bit for messages which do not target a target device 4 connected to that bus interface 10. This ensures that once download starvation has been detected for a particular message, that message will remain in the priority state until it is downloaded.

Figure 8:
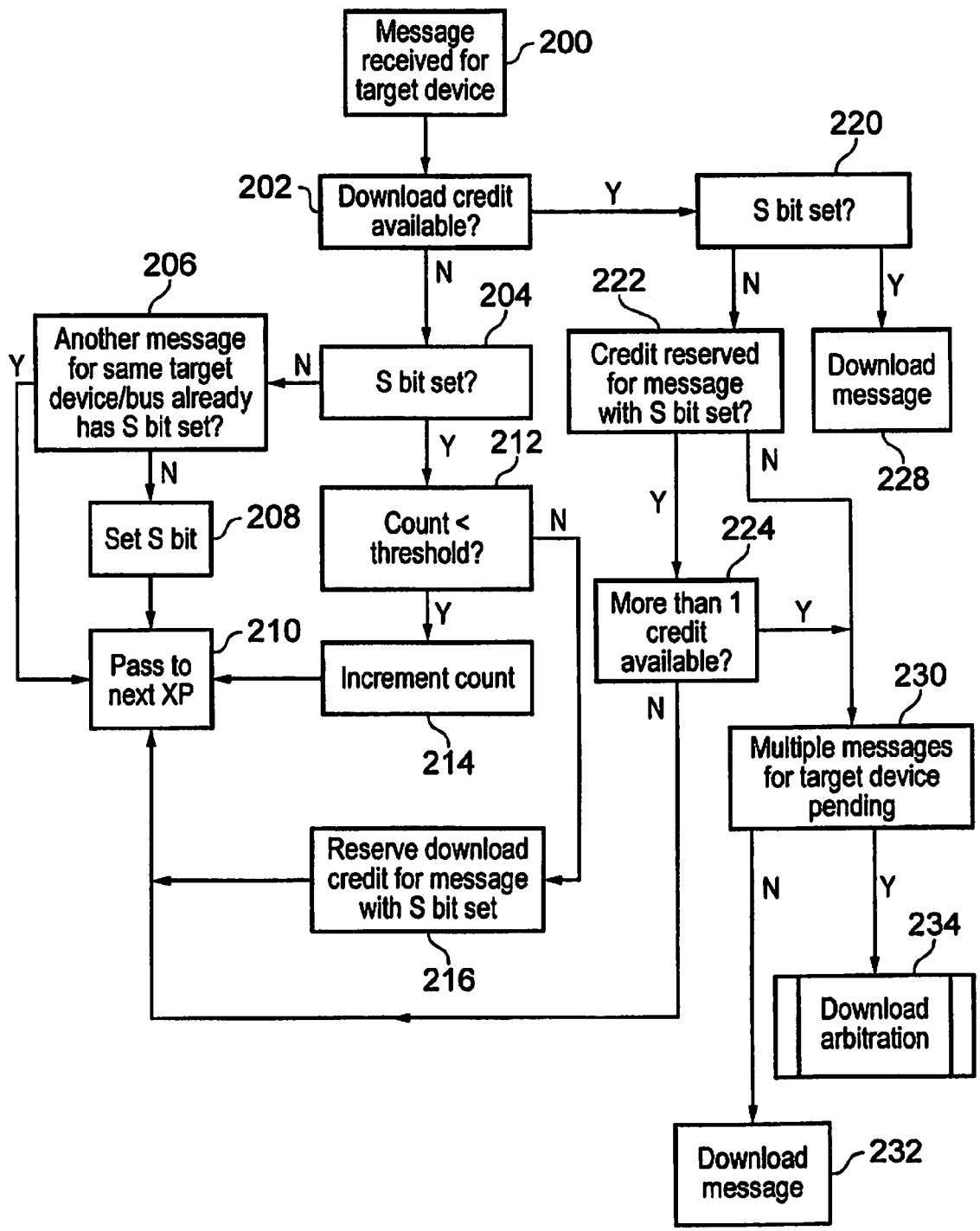
FIG. 8 shows a method of handling downloading of messages using the starvation flag.

FIG. 8 shows a method for handling the processing of messages to avoid download starvation. At step 200, a bus interface 10 receives a message targeting a target device 4 which is connected to that bus interface 10. At step 202, the bus interface 10 checks whether a download credit is available from the target device 4.

If no download credit is available, then at step 204 the bus interface 10 determines whether the starvation bit has been set to the priority state for that message. If the starvation bit has not been set, then at step 206 the bus interface 10 checks whether another message for the same target device 4 and the same bus 12, 14 already has the starvation bit set. If no other message for the same target device 4 and the same bus 12, 14 has the starvation bit set, then at step 208 the starvation bit is set for the message, and the message is then passed to the next bus interface in the network at step 210. On the other hand, if another message for the same target device received on the same bus already has the starvation bit set to the priority state, then at step 210 the message is passed to the next bus interface without setting the starvation bit.

On the other hand, if at step 204 it is determined that the starvation bit was set for the received message, then at step 212 the bus interface 10 determines whether the counter value of the counter 95 corresponding to that message is less than the starvation threshold count. If so, then at 214 the count value is incremented and at step 210 the message is passed to the next bus interface 10 in the network. However, if the counter value is not less than (i.e. equal to) the starvation threshold count, then the starvation scenario is detected, and at step 216 the bus interface 10 reserves a download credit for the message having the starvation bit set to the priority state. At step 210, the message is then passed to the next bus interface 10.

When a message is received at step 200 and a download credit is determined to be available at step 202, then at step 220 the bus interface determines whether the starvation bit is set to the priority state for the received message. If so, then the message is downloaded at step 228, hence resolving the download starvation of this message.

Alternatively, if the starvation bit is not set for the received message, then at step 222 the bus interface 10 determines whether a credit has been reserved for the message that has the starvation bit set to the priority state. If so, then it is determined whether there is more than one download credit available at step 224. If there is only one download credit available, then the message not having the starvation bit set is passed to the next bus interface 10 at step 210. This prevents the only available download credit being used by the message which does not have the starvation bit set.

If at step 222, no credit has been reserved for the message with the starvation bit set, or at step 224 there is found to be more than one download credit available, then the message not having the starvation bit set to the priority state is free to use the available download credit. Hence, in either of these situations, the method proceeds to step 230, where the bus interface 10 determines whether there are multiple messages pending for download by the same target device 4. If not, then at step 232 the message is downloaded. On the other hand, if there are multiple pending messages, then at step 234 download arbitration is performed to select which of the messages to download.

Figure 9:
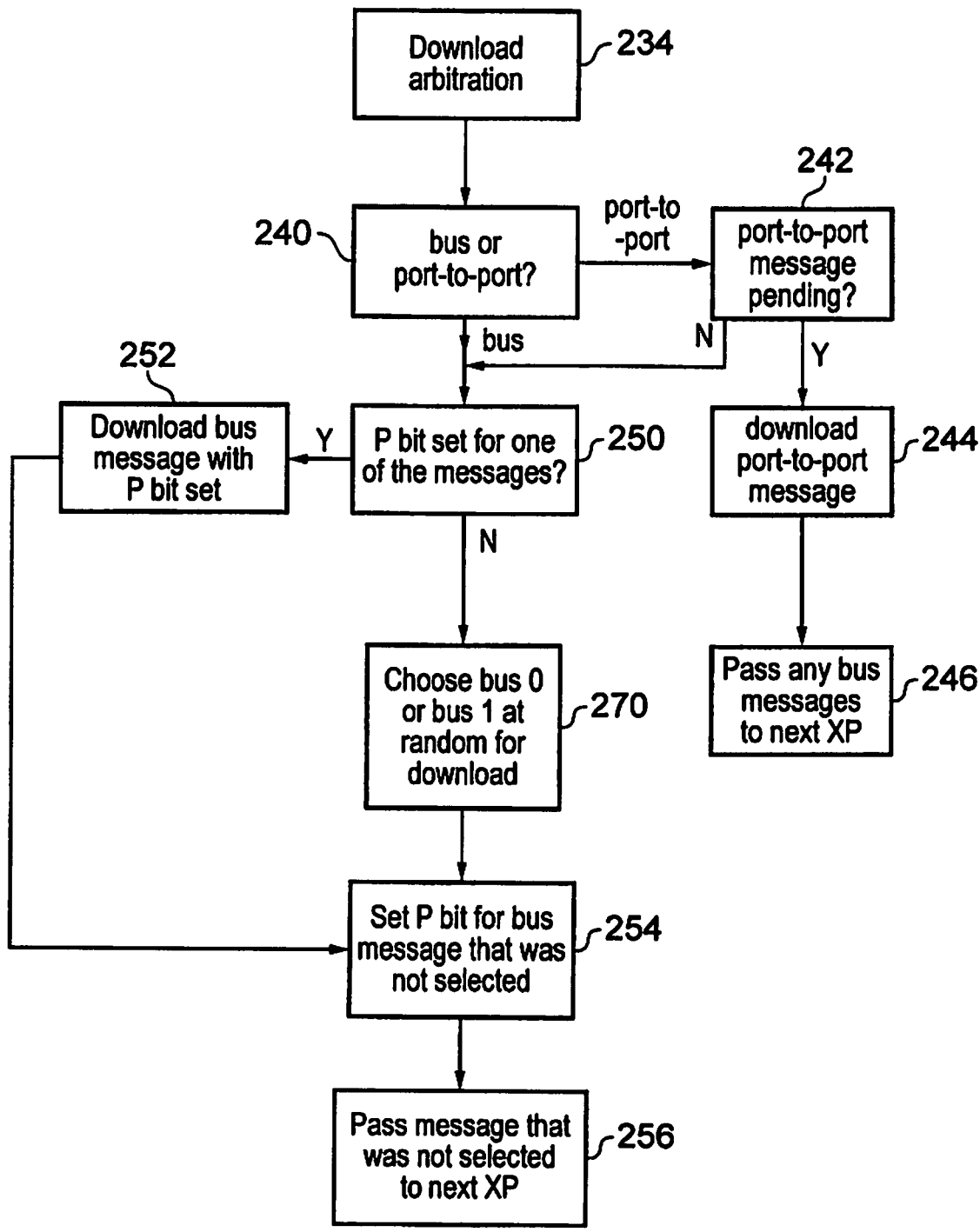
FIG. 9 illustrates a method of download arbitration.

FIG. 9 illustrates the download arbitration performed at step 234. As described above, the download arbitration is performed based on the state of the priority bit 22 using the two stage arbitration scheme shown in FIG. 5. At step 240, the target bus interface 10 determines whether to select a message received from the buses 12, 14 or from the port-to-port path 40. For example, the bus interface 10 may determine whether the weighted round robin scheme has allocated the current processing cycle for downloading of a bus message or a port-to-port message. If the port-to-port path is selected, then at step 242 the bus interface 10 checks whether a message from the port-to-port path is pending. If so, then at step 244 the message on the port-to-port path 40 is downloaded by the target device 4 and at step 246 any messages received via the buses 12, 14 are passed to the next bus interface 10 along the respective buses.

On the other hand, if at step 240 a message from one of the buses is selected, or at step 242 no port-to-port message is pending, then at step 250 the bus interface 10 determines whether the priority bit 22 is set to the priority state for either of the received messages targeting the same device 4. If one of the messages has the priority bit set then at step 252 that message is selected for downloading by the target device 4, and at step 254 the other message, which lost the arbitration, has its priority bit 22 set to the priority state. The message which lost the arbitration is then transmitted to the next bus interface at step 256.

If at step 250 neither of the messages has the priority bit set, then at step 270 the bus interface selects one of the messages at random for downloading and the selected message is downloaded by the target device 4. At step 254, the priority bit for the message which was not selected is set to the priority state and at step 256 that message is passed to the next bus interface 10.

In summary, by tagging messages with a download control bit (such as the priority bit or the starvation bit), messages which have already passed the target bus interface at least once without being downloaded can be prioritised for download selection on future occasions.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An integrated circuit comprising:
a plurality of devices; and
a bus network configured to transfer messages between said plurality of devices, said bus network comprising a plurality of bus interfaces for connecting said devices to said bus network, and at least one bus connecting said plurality of bus interfaces; wherein:
said bus network is configured to transfer a message specifying a target device that is connected to a target bus interface;
said plurality of bus interfaces are configured to continue passing said message from bus interface to bus interface until said message is downloaded from said target bus interface by said target device;

said message is associated with at least one download control flag which is transferred along with said message via said bus network;

said at least one download control flag is settable to a priority state indicating that said message has passed said target bus interface at least once without said message being downloaded by said target device; and said target bus interface is configured to control selection of messages to be downloaded by said target device, with messages for which said at least one download control flag is set to said priority state having a greater probability of being selected than messages for which said at least one download control flag is not set to said priority state, wherein said bus network comprises at least two buses connecting said plurality of bus interfaces, said at least one download control flag comprises a priority flag; and on receiving multiple messages specifying the same target device from said at least two buses in a same processing cycle, said target bus interface is configured to control download arbitration between said multiple messages in dependence on said priority flag for said multiple messages.

2. The integrated circuit according to claim 1, wherein said plurality of bus interfaces are connected in a ring topology by said at least one bus.

3. The integrated circuit according to claim 1, wherein said target bus interface is configured to determine, on receiving said multiple messages from said at least two buses, whether said target device is available for downloading a message, and if so to perform said download arbitration.

4. The integrated circuit according to claim 1, wherein in said download arbitration, said target bus interface is configured to select one of said multiple messages for downloading by said target device and to set said priority flag to said priority state for another of said multiple messages which is not selected for downloading.

5. The integrated circuit according to claim 4, wherein in said download arbitration, said target bus interface is configured to select at random any one of said multiple messages for downloading by said target device if none of said multiple messages has said priority flag set to said priority state.

6. The integrated circuit according to claim 4, wherein in said download arbitration, if one of said multiple messages has said priority flag set to said priority state, then said target bus interface is configured to select the message having said priority flag in said priority state for downloading by said target device.

7. The integrated circuit according to claim 1, wherein at least one of said bus interfaces is a multi-port bus interface comprising a plurality of device ports, each device port for connecting one of said devices to said multi-port bus interface; and said multi-port bus interface has a port-to-port message path for transmitting port-to-port messages between the devices connected to said plurality of device ports.

8. An integrated circuit comprising:
a plurality of devices; and
a bus network configured to transfer messages between said plurality of devices, said bus network comprising a plurality of bus interfaces for connecting said devices to said bus network, and at least one bus connecting said plurality of bus interfaces; wherein:
said bus network is configured to transfer a message specifying a target device that is connected to a target bus interface;

said plurality of bus interfaces are configured to continue passing said message from bus interface to bus interface until said message is downloaded from said target bus interface by said target device;

said message is associated with at least one download control flag which is transferred along with said message via said bus network;

said at least one download control flag is settable to a priority state indicating that said message has passed said target bus interface at least once without said message being downloaded by said target device; and said target bus interface is configured to control selection of messages to be downloaded by said target device, with messages for which said at least one download control flag is set to said priority state having a greater probability of being selected than messages for which said at least one download control flag is not set to said priority state, wherein at least one of said bus interfaces is a multi-port bus interface comprising a plurality of device ports, each device port for connecting one of said devices to said multi-port bus interface; and said multi-port bus interface has a port-to-port message path for transmitting port-to-port messages between the devices connected to said plurality of device ports, wherein on receiving in a same processing cycle a bus message from said at least one bus and a port-to-port message on said port-to-port message path, said bus message and said port-to-port message targeting the same target device, said multi-port bus interface is configured to select one of said bus message and said port-to-port message for downloading by said target device.

9. The integrated circuit according to claim 8, wherein said multi-port bus interface is configured to select said one of said bus message and said port-to-port message according to a weighted round robin scheme which is weighted to select said bus message more frequently than said port-to-port message.

10. The integrated circuit according to claim 7, wherein said bus network comprises at least two buses, said at least one download control flag comprises a priority flag; and on receiving in a same processing cycle multiple bus messages from said at least two buses and a port-to-port message from said port-to-port message path each targeting the same target device, said target bus interface is configured to determine whether to select said port-to-port message for downloading by said target device, and if said port-to-port message is not selected, to perform download arbitration between said multiple bus messages in dependence on said priority flag for said multiple bus messages.

11. The integrated circuit according to claim 1, wherein said at least one download control flag comprises a starvation flag; and said target bus interface is configured, on receiving a message for which said starvation flag has not already been set to said priority state, to set said starvation flag to said priority state if said target device specified by said message is not available to download said message.

12. An integrated circuit comprising:
a plurality of devices; and
a bus network configured to transfer messages between said plurality of devices, said bus network comprising a plurality of bus interfaces for connecting said devices to said bus network, and at least one bus connecting said plurality of bus interfaces; wherein:
said bus network is configured to transfer a message specifying a target device that is connected to a target bus interface;

said plurality of bus interfaces are configured to continue passing said message from bus interface to bus interface until said message is downloaded from said target bus interface by said target device;

said message is associated with at least one download control flag which is transferred along with said message via said bus network;

said at least one download control flag is settable to a priority state indicating that said message has passed said target bus interface at least once without said message being downloaded by said target device; and said target bus interface is configured to control selection of messages to be downloaded by said target device, with messages for which said at least one download control flag is set to said priority state having a greater probability of being selected than messages for which said at least one download control flag is not set to said priority state, wherein said at least one download control flag comprises a starvation flag; and said target bus interface is configured, on receiving a message for which said starvation flag has not already been set to said priority state, to set said starvation flag to said priority state if said target device specified by said message is not available to download said message, wherein said target bus interface is configured to increment a counter if, on receiving a message for which said starvation flag has already been set to said priority state, said target device is not available to download said message.

13. The integrated circuit according to claim 12, wherein said target bus interface is configured to reserve a download opportunity for said message having the starvation flag set to said priority state if said counter reaches a threshold value.

14. The integrated circuit according to claim 13, wherein said target bus interface is configured to prevent messages not having said starvation flag set to said priority state being downloaded by said target device in the reserved download opportunity.

15. An integrated circuit comprising:
a plurality of devices; and
a bus network configured to transfer messages between said plurality of devices, said bus network comprising a plurality of bus interfaces for connecting said devices to said bus network, and at least one bus connecting said plurality of interfaces; wherein:
said bus network is configured to transfer a message specifying a target device that is connected to a target bus interface;
said plurality of bus interfaces are configured to continue passing said message from bus interface to bus interface until said message is downloaded from said target bus interface by said target device;
said message is associated with at least one download control flag which is transferred along with said message via said bus network;
said at least one download control flag is settable to a priority state indicating that said message has passed said target bus interface at least once without said message being downloaded by said target device; and
said target bus interface is configured to control selection of messages to be downloaded by said target device, with messages for which said at least one download control flag is set to said priority state having a greater probability of being selected than messages for which said at least one download control flag is not set to said priority state, wherein said at least one download control flag comprises a starvation flag; and said target bus interface is configured, on receiving a message for which said starvation flag has not already been set to said priority state, to set said starvation flag to said priority state if said target device specified said message is not available to download said message, wherein said target bus interface is configured to prevent said starvation flag being set to said priority state if another message specifying the same target device and transmitted on the same bus already has said starvation flag set to said priority state.

16. The integrated circuit according to claim 4, wherein said at least one download control flag comprises a starvation flag;
said target bus interface is configured, on receiving a message for which said starvation flag has not already been set to said priority state, to set said starvation flag to said priority state if said target device specified by said message is not available to download said message; and
in said download arbitration, if none of said multiple messages has said priority flag in said priority state, and one of said multiple messages has said starvation flag in said priority state, then said target bus interface is configured to select for downloading by said target device said one of said multiple messages having said starvation flag in said priority state.

17. An integrated circuit comprising:
a plurality of device means for providing data processing functions; and
bus network means for transferring messages between said plurality of device means, said bus network means comprising a plurality of bus interface means for connecting said device means to said bus network means, and at least one bus means for connecting said plurality of bus interface means; wherein:
said bus network means is for transferring a message specifying a target device means that is connected to a target bus interface means;
said plurality of bus interface means are configured to continue passing said message from bus interface means to bus interface means until said message is downloaded from said target bus interface means by said target device means;
said message is associated with at least one download control flag which is transferred along with said message via said bus network means;
said at least one download control flag is settable to a priority state indicating that said message has passed said target bus interface means at least once without said message being downloaded by said target device means; and
said target bus interface means is configured to control selection of messages to be downloaded by said target device means, with messages for which said at least one download control flag is set to said priority state having a greater probability of being selected than messages for which said at least one download control flag is not set to said priority state, wherein said bus network means comprises at least two bus means connecting said plurality of bus interface means,
said at least one download control flag comprises a priority flag; and
on receiving multiple messages specifying the same target device means from said at least two bus means in a same processing cycle, said target bus interface means is configured to download arbitration between said multiple messages in dependence on said priority flag for said multiple messages.

18. A method for an integrated circuit comprising a plurality of devices, a bus network configured to transfer messages between said plurality of devices, said bus network comprising a plurality of bus interfaces for connecting said devices to said bus network, and at least one bus connecting said plurality of bus interfaces; said method comprising steps of:

transferring a message over said bus network, wherein said message specifies a target device that is connected to a target bus interface, and said message is associated with at least one download control flag which is transferred along with said message via said bus network; and passing said message from bus interface to bus interface until said message is downloaded from said target bus interface by said target device;

wherein said at least one download control flag is settable to a priority state indicating that said message has passed said target bus interface at least once without said message being downloaded by said target device; and said method comprises said target bus interface controlling selection of messages to be downloaded by said target device, with messages for which said at least one download control flag is set to said priority state having a greater probability of being selected than messages for which said at least one download control flag is not set to said priority state, wherein said bus network comprises at least two buses connecting said plurality of bus interfaces, said at least one download control flag comprises a priority flag; and, on receiving multiple messages specifying the same target device from said at least two buses in a same processing cycle, said target bus interface controlling download arbitration between said multiple messages in dependence on said priority- flag for said multiple messages.

* * * * *